United States Patent
Sugihara et al.

(10) Patent No.: US 9,500,783 B2
(45) Date of Patent: Nov. 22, 2016

(54) LIGHT-GUIDING PRISM AND IMAGE DISPLAY APPARATUS

(71) Applicant: OLYMPUS CORPORATION, Tokyo (JP)

(72) Inventors: Ryohei Sugihara, Tokyo (JP); Shinya Takahashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/139,540

(22) Filed: Apr. 27, 2016

(65) Prior Publication Data

US 2016/0238848 A1 Aug. 18, 2016

Related U.S. Application Data

(63) Continuation of application No. PCT/JP2013/006354, filed on Oct. 28, 2013.

(51) Int. Cl.
*G02B 5/04* (2006.01)
*G02B 27/01* (2006.01)

(52) U.S. Cl.
CPC ............. *G02B 5/04* (2013.01); *G02B 27/0172* (2013.01); *G02B 2027/012* (2013.01); *G02B 2027/0178* (2013.01)

(58) Field of Classification Search
CPC .................................................... G02B 5/04
USPC ........................................ 359/831, 833, 834
See application file for complete search history.

(56) References Cited

U.S. PATENT DOCUMENTS

| | | | | |
|---|---|---|---|---|
| 3,807,842 A | * | 4/1974 | Baker | G03B 21/20 352/78 R |
| 2011/0051077 A1 | * | 3/2011 | Sugihara | G02B 27/0172 351/158 |
| 2012/0242561 A1 | * | 9/2012 | Sugihara | G02B 27/0172 345/8 |
| 2013/0329397 A1 | * | 12/2013 | Shimizu | F21V 29/20 362/84 |

FOREIGN PATENT DOCUMENTS

| | | |
|---|---|---|
| JP | 2008-535001 A | 8/2008 |
| JP | 2010-122478 A | 6/2010 |
| JP | 2010-224473 A | 10/2010 |
| JP | 2012-168427 A | 9/2012 |
| JP | 2012-203113 A | 10/2012 |

OTHER PUBLICATIONS

International Search Report dated Dec. 3, 2013 issued in PCT/JP2013/006354.

* cited by examiner

*Primary Examiner* — Darryl J Collins
(74) *Attorney, Agent, or Firm* — Scully, Scott, Murphy & Presser, PC

(57) ABSTRACT

Provided is a light guide prism including: an incident surface; one or more reflection surfaces, the reflection surfaces including at least an emission side reflection surface; and an emission surface, in which the light guide prism has a tip face positioned between the emission side reflection surface and the emission surface, the tip face most protruding from an end of the emission side reflection surface and from an end of the emission surface in a direction in which a width between the emission side reflection surface and the emission surface narrows, the tip face being a curved face. Further provided is an image display apparatus including: a display device; the light guide prism; and a support.

6 Claims, 5 Drawing Sheets

LIGHT-GUIDING PRISM AND IMAGE DISPLAY APPARATUS

CROSS-REFERENCE TO RELATED APPLICATION

The present application is a Continuing Application based on International Application PCT/JP2013/006354 filed on Oct. 28, 2013, the entire disclosure of this earlier application being herein incorporated by reference.

TECHNICAL FIELD

The present disclosure relates to a light-guiding prism (also referred to as light guide prism) which guides image light emitted from a display device to display a virtual image of the display image within the visual field of the observer, and also to an image display apparatus using the light guide prism.

BACKGROUND

There has been proposed in recent years a compact and wearable image display apparatus to be head-mounted or spectacle-mounted. As an example of such image display apparatus, there has been known a device in which image light of an image displayed on a compact image display apparatus is guided through a transparent light guide member to the front of the eye of the observer so as to be displayed as an enlarged virtual image within the visual field of the observer (see, for example, Patent Literatures (PTL) 1, 2). A light guide member configured as described above, in particular, may be partially exposed from the casing, so as to be configured compact/light-weight in device size around the eye, and such compact and light-weight light guide member does not largely shield the visual field, making the image display apparatus available as a wearable device that can always be put on during use.

CITATION LIST

Patent Literature

PTL 1: JP2010122478A
PTL 2: JP2012203113A

SUMMARY

Technical Problem

However, in the light guide member which is exposed without being stored in the casing, the light guide prism will be subjected to direct sunlight during outdoor use, leading to various problems. In particular, external light incident from the light guide prism tip directly reaches the display device to affect transistors of the display device, which may cause disturbance in video and reduction in contrast.

With this in view, it may be conceivable to cover a light guide prism with coatings. However, a compact and light-weight light guide member only allows a small area for the coating, making the coating susceptible to peeling in parts being touched by the user. The external light shielding effect will also be lost if the coating peels off during use, which leads to a fear that external light reach the display device to disturb the image.

It could therefore be helpful to provide a light guide prism usable as a light guide member, in which the amount of external light reaching the display device is suppressed, and an image display apparatus using the light guide prism.

The summary and construction of the disclosure is as follows.

The disclosed light guide prism includes: an incident surface through which image light from a display device is incident; one or more reflection surfaces which reflect the image light incident thereon, the reflection surfaces including at least an emission side reflection surface; and an emission surface which forms an angle with the emission side reflection surface and emits the image light reflected by the emission side reflection surface, toward an eyeball of an observer, in which the light guide prism has a tip face positioned between the emission side reflection surface and the emission surface, the tip face most protruding from an end of the emission side reflection surface and from an end of the emission surface, in a direction in which a width between the emission side reflection surface and the emission surface narrows.

Further, in the disclosed light guide prism, the tip face may preferably has a plurality of convex portions.

In addition, in the disclosed light guide prism, the tip face may preferably have a curved portion having a center of curvature within the light guide prism and a curved portion having a center of curvature outside the light guide prism.

Furthermore, in the disclosed light guide prism, the emission surface may preferably be formed as a lens surface and the light guide prism may preferably satisfy the following relation:

$$f2 < f1/2,$$

where f1 represents the focal length of the emission surface and f2 represents the focal length of the tip face on a cross section having the maximum curvature radius of the tip face.

Here, the disclosed image display apparatus includes: a display device which emits image light; the light guide prism described in one of the aforementioned aspects; and a support which fixedly supports the display device and the light guide prism onto a head of an observer.

Further, the disclosed image display apparatus may preferably satisfy the following relation:

$$f2 < L/2$$

where f2 represents the focal length of the tip face on a cross section having the maximum curvature radius of the tip face, and L represents a length from the tip face to the display device.

Advantageous Effect

The disclosed embodiments and structures are capable of providing a light guide prism for use as a light guide member, in which the amount of external light reaching the display device is suppressed, and an image display apparatus using the light guide prism.

BRIEF DESCRIPTION OF THE DRAWINGS

In the accompanying drawings.

DETAILED DESCRIPTION

In below, an embodiment disclosed herein is illustrated by way of example with reference to the drawings.

Embodiment 1

Figure 1:
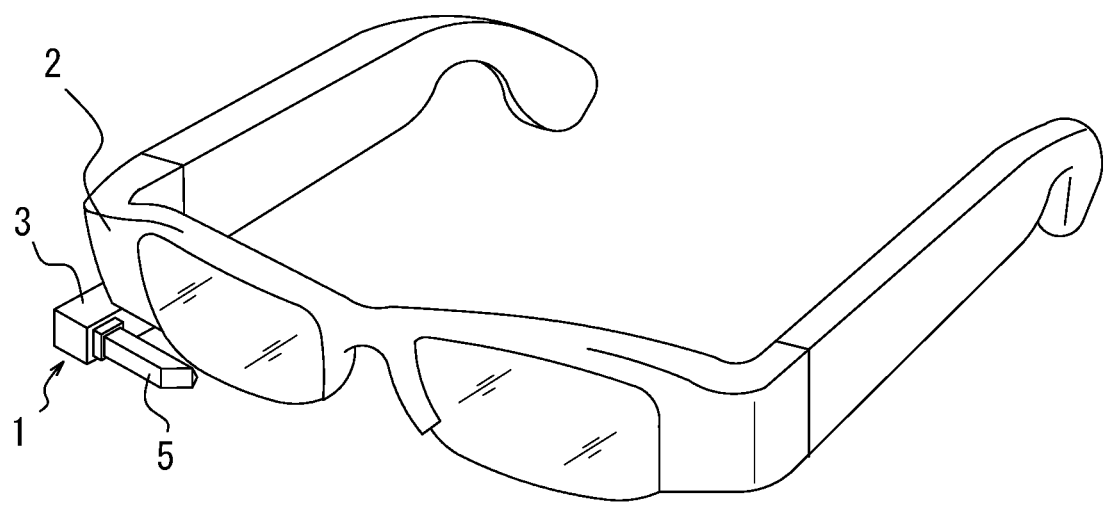
FIG. 1 is a perspective view of an image display apparatus according to Embodiment 1.

FIG. 1 is a perspective view of an image display apparatus 1 according to Embodiment 1 disclosed herein. The image display apparatus 1 includes: a support 2 in a spectacle-like shape, which fixedly supports the entire image display apparatus onto the head of the observer; a main body 3 being fixed to a temple (frame in the temporal region) of the support 2 and incorporating therein a display device 4 (see FIG. 2); and a light guide prism 5 being supported, at one end thereof, by the main body 3 and having the other end extended to the front of the eye of the observer when the device is worn by the observer. The main body 3 includes, in addition to the display device 4, an electronic circuit for displaying an image on the display device 4 and communications capabilities for receiving video data through wire or radio from outside the main body 3.

Figure 2A:
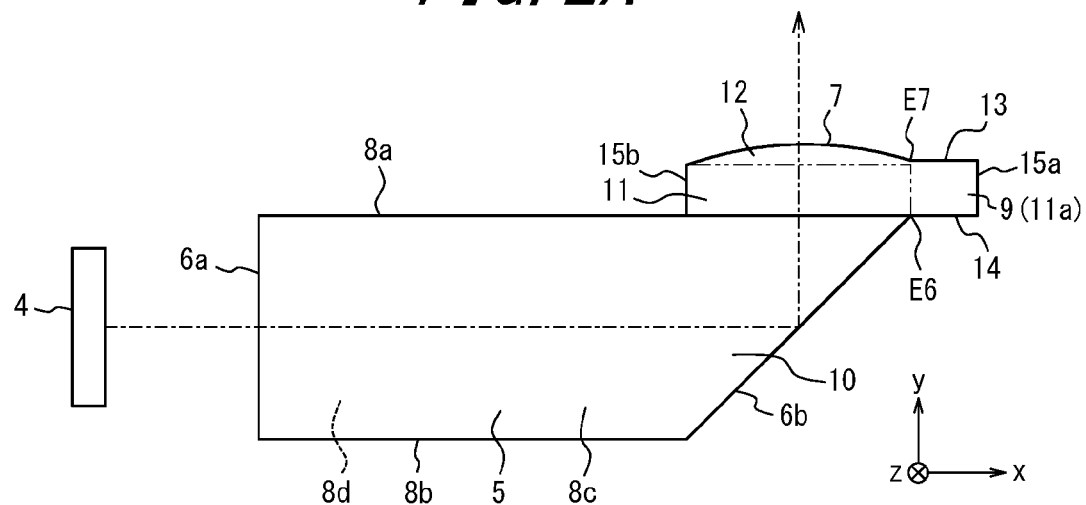
FIG. 2A is a plan view of a light guide prism according to Embodiment 1.
Figure 2B:
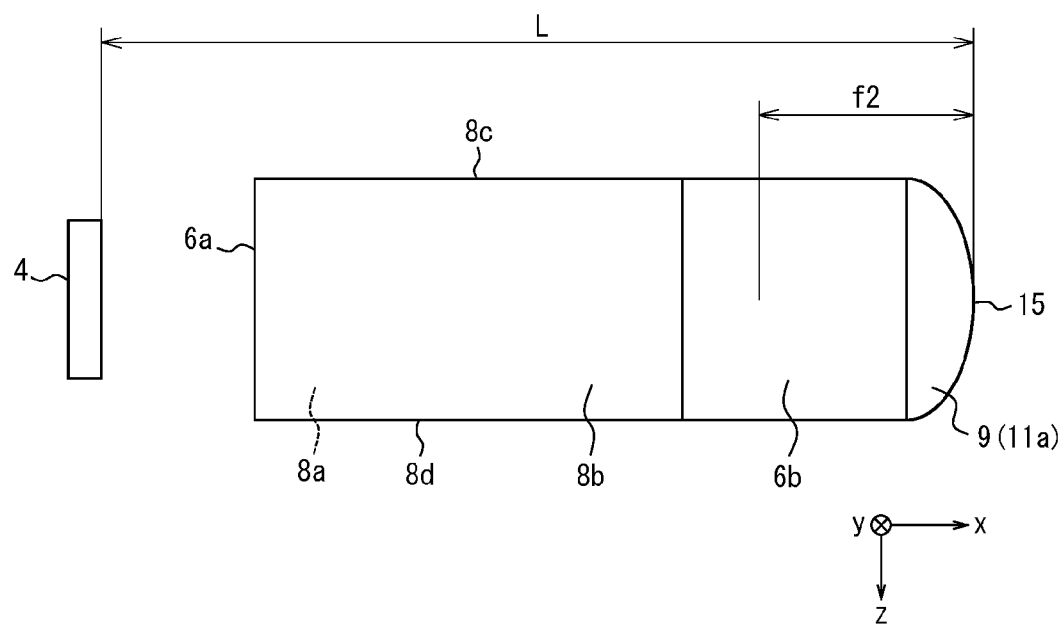
FIG. 2B is a front view of a light guide prism according to Embodiment 1.

FIG. 2 A is a plan view of the light guide prism 5 according to an embodiment disclosed herein, and FIG. 2B is a front view of the light guide prism 5 according to an embodiment disclosed herein. As illustrated in FIGS. 2A and 2B, the light guide prism 5 has an incident surface 6a through which image light from the display device 4 is incident, one or more reflection surfaces including at least an emission side reflection surface 6b (in the illustrated example, the reflection surface has only one emission side reflection surface 6b), and an emission surface 7 which forms an acute angle with the emission side reflection surface 6b and emits, toward an eyeball of the observer, image light reflected by the emission side reflection surface 6b. The emission surface 7 is formed as a lens surface.

Here, the display device 4 is a liquid crystal display device or an organic EL device for displaying an image to be observed, and incorporated within the main body 3 of FIG. 1. The display device 4 is configured to cause image light of an image displayed on the display device 4 to be incident through the incident surface 6a of the light guide prism 5. A protection window (not shown) for protecting the display device 4 may desirably be disposed between the display device 4 and the incident surface 6a of the light guide prism 5.

Here, as illustrated in FIGS. 2A, 2B, the light guide prism 5 is formed of a transparent resin elongated in one direction. The light guide prism 5 includes the incident surface 6a and the reflection surface 6b at both ends in the longitudinal direction corresponding to the traveling direction of image light, and has a first side face 8a, a second side face 8b, a third side face 8c, and a fourth side face 8d between the incident surface 6a and the reflection surface 6b so as to surround the optical path of image light. In the image display apparatus 1 worn by the observer, the first side face 8a is positioned at a plane facing the front of the observer, the second side face 8b is positioned at a plane facing opposite to the front of the observer, the third side face 8c serves as an upper face of the light guide prism 5, and the fourth side face 8d serves as a lower face of the light guide prism 5. In other words, the first side face 8a and the second side face 8b are opposed to each other, and the third side face 8c and the fourth side face 8d are opposed to each other.

In FIGS. 2A and 2B, the first to fourth side faces 8a to 8d are formed as planes each being substantially perpendicular to the incident surface 6a. However, the first to fourth side faces 8a to 8d may be slightly curved, or may be formed wider on the incident surface 6a side than the reflection surface 6b side. For example, the distance between the third side face 8c and the fourth side face 8d may be shorter on the reflection surface 6b side than on the incident surface 6a side.

The reflection surface 6b is formed as a slope tilted at about 45° relative to the longitudinal direction of the light guide prism 5, with the inner surface thereof facing the observer. The reflection surface 6b is formed as a mirror face through, for example, aluminum sputtering so that image light traveling through the light guide prism 5 in the longitudinal direction is subjected to total reflection. The surface may be formed as a total reflection surface without being coated with a reflective film, depending on the conditions such as the refractive index of the material of the light guide prism 5 and the angle of the reflection surface.

The first side face 8a has an emission surface 7 disposed in a part adjacent to the reflection surface 6b. The emission surface 7 is formed as a convex surface positioned on the optical path of image light reflected by the reflection surface 6b toward the eyeball. The emission surface 7 is formed integrally with the light guide prism 5. The emission surface 7 may be integrally formed with the light guide prism 5 using a resin, to thereby allow the light guide prism 5 to be mass-produced at low cost. However, the emission surface 7 may also be formed of a plano-convex lens cemented onto the first side face 8a formed as a plane. In FIGS. 2 to 9, the optical axis of the emission surface 7 is indicated by the alternate long and short dash line. The optical axis is bent at the reflection surface 6b and passes through the center of the display device 4. Between the incident surface 6a and the reflection surface 6b, the direction of the optical axis coincides with the longitudinal direction of the light guide prism 5.

Here, in FIGS. 2A, 2B, the traveling direction of normal light of image light, in the longitudinal direction of the light guide prism 5, is defined as the forward direction (the positive direction of the x-axis in the illustrated example). At this time, as illustrated in FIG. 2A, the light guide prism 5 of Embodiment 1 further has a prism tip 9 which is positioned between the emission surface 7 and the reflection surface 6b and protrudes further forward relative to the forward end E7 of the emission surface 7 and the forward end E6 of the reflection surface 6b. In other words, the light guide prism 5 has the prism tip 9 disposed as protruding from an end of the reflection surface 6b and from an end of the emission surface 7, in the direction in which the width between the reflection surface 6b and the emission surface 7 narrows. The light guide prism 5 of Embodiment 1, which includes the prism tip 9 only in the forward direction, may also be provided, in light of the external appearances, with a prism tip 9b which is positioned between the emission surface 7 and the reflection surface 6b and protruding further backward relative to the backward end of the emission surface 7 and the backward end of the reflection surface 6b. The prism tip 9 may have a protruding width of, for example, 0.5 mm to 2 mm, without being particularly limited thereto. Further, the prism tip 9 may preferably have a height of 0.5 mm to 1.5 mm.

The light guide prism 5 of Embodiment 1 includes, as illustrated in FIG. 2A: a light guide part 10 (corresponding to the part defined by the incident surface 6a, the reflection surface 6b, and the first to fourth side faces 8a to 8b in the illustrated example) which guides image light toward the eyeball; a sheet-like plate part 11 disposed adjacent to the light guide part 10; and a convex lens part 12 formed on the plate part 11, the convex lens part 12 causing the image light to be observed as a virtual image. The light guide part 10, the plate part 11, and the convex lens part 12 are integrally formed. Then, the plate part 11 has a protruding part 11a (9) as a part protruding from an end of the reflection surface 6b and from an end of the emission surface 7, in a part protruding forward relative to the light guide part 10, i.e., in the direction in which the width between the reflection surface 6b and the incident surface 7 narrows.

The prism tip 9 on the forward side has two flat faces 13, 14 each substantially parallel with the side faces 8a, 8b, respectively, in the illustrated example. Then, the prism tip 9 on the forward side has a tip face 15a which abuts the two flat faces 13, 14, and is substantially perpendicular to the side faces 8a, 8b. The tip face 15a is a plane positioned on the most forward side of the prism tip 9, that is, a plane that is most protruding from an end of the reflection surface 6b and from an end of the emission surface 7, in a direction in which the width between the reflection surface 6b and the emission surface 7 narrows. Meanwhile, the light guide prism 5 has, on the most backward side of the plate part 11, a tip face 15b which abuts the emitting surface 7 and the side face 8b and is substantially perpendicular to the side faces 8a, 8b. In the illustrated example, the tip faces 15a, 15b are configured as mirror-finished faces being small in surface roughness. However, the tip face 15a alone may be configured as a mirror-finished face.

Here, in the light guide prism 5 of Embodiment 1, the tip face 15a has a curvature as illustrated in FIG. 2B. In the illustrated example, the tip face 15a is formed as a single arc convexly curved forward in a front view. In other words, in this example, the tip face 15a is formed to have a center of the curvature on a backward side. Here, in the light guide prism 5 of Embodiment 1, the tip face 15a is curved with a curvature in the x-z plane without having a curvature on a plane parallel with the y-axis, where the traveling direction of normal light after being reflected by the reflection surface 6b is defined as the positive direction of the y-axis, and a direction defined as the z-axis direction is perpendicular to the x-axis and the y-axis.

However, the tip face 15a may be in any shape as long as with a curvature, and may be formed, for example, as a single arc convexly curved backward (so as to have a center of the curvature on a forward side) in a front view. Further, the center of curvature of the tip face 15a disclosed herein may be in any direction. For example, the tip face 15a may be formed in a spherical shape. In this case, the tip face 15a will be in a shape having a curvature in every one of the x-y plane, the y-z plane, and the z-x plane.

Further, the tip face 15a may include a plurality of the convex portions and all the convex portions may be formed to have a center of curvature within the light guide prism 5 (for example, may be convexly curved forward). Alternatively, all the convex portions may have a center of curvature outside the light guide prism 5 (for example, may be convexly curved backward). Otherwise, the tip face 15b may have both a curved portion having a center of curvature within the light guide prism 5 and a curved portion having a center of curvature outside the light guide prism 5.

Further, in the case where the tip face 15a has a plurality of convex portions, the convex portions may all be the same in curvature radius, or some or all of the convex portions may be different from one another in curvature radius.

Hereinafter, the operation and effect of the light guide prism 5 of Embodiment 1 are described.

Figure 3A:
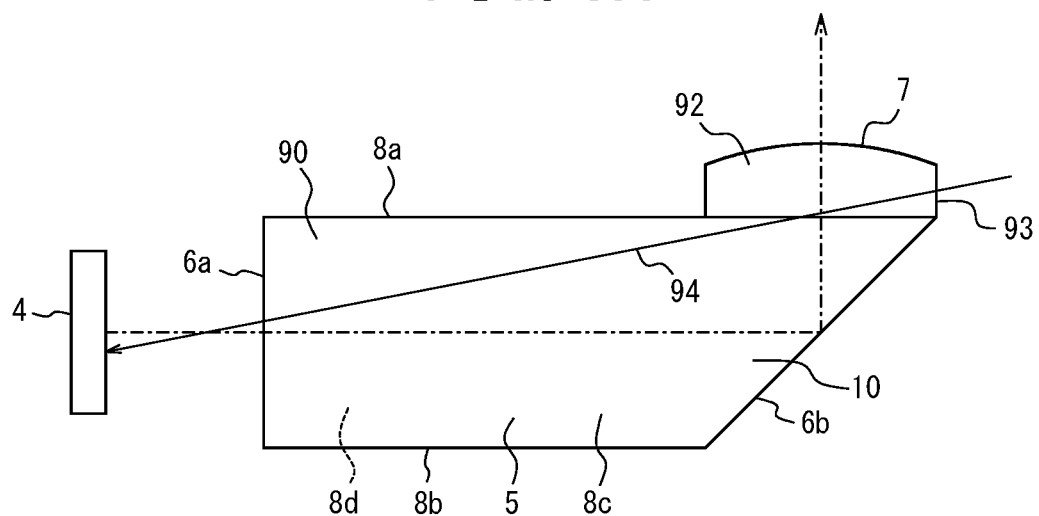
FIG. 3A is a plan view illustrating an example of the optical path of external light in a conventional light guide prism.
Figure 3B:
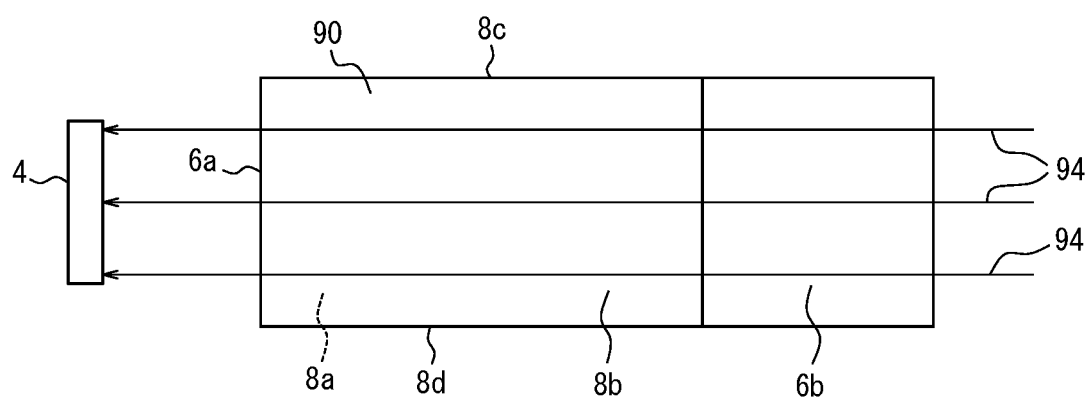
FIG. 3B is a front view illustrating an example of the optical path of external light in a conventional light guide prism.

First, FIG. 3A is a plan view illustrating an example of the optical path of external light in a conventional light guide prism 90, and FIG. 3B is a front view illustrating an example of the optical path of external light in a conventional light guide prism 90. As illustrated in FIGS. 3A and 3B, when no housing or coating is provided for preventing the incidence of external light into the light guide prism 90, external light 94 incident on the tip face 93 of an eyepiece lens 92 from outside the light guide prism 90 will be directly irradiated, without being condensed or diffused, onto the display device 4 with strong illuminance. This may affect transistors of the display device 4, causing disturbance in video and reduction in contrast.

Figure 4A:
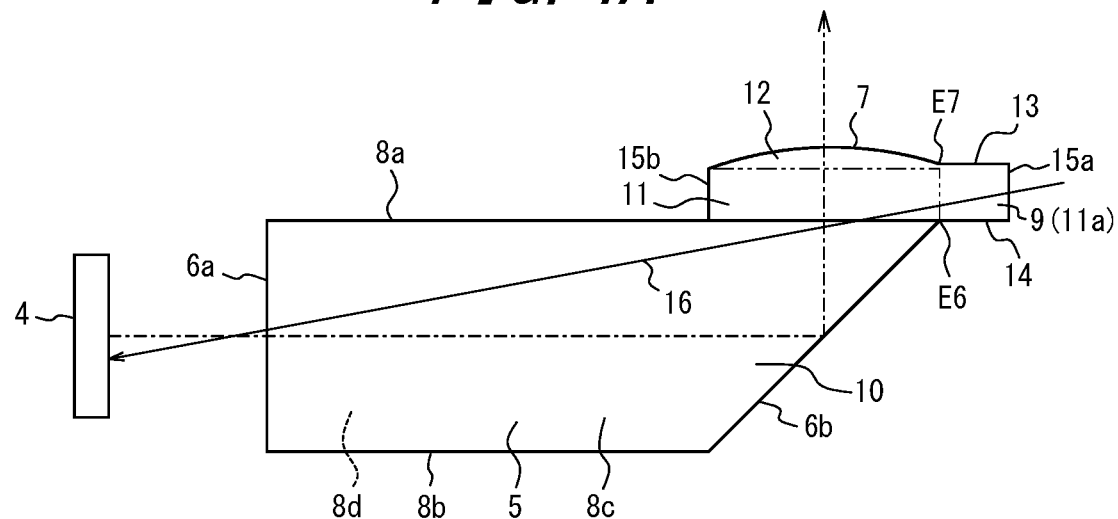
FIG. 4A is a plan view illustrating how external light travels in the light guide prism of Embodiment 1.
Figure 4B:
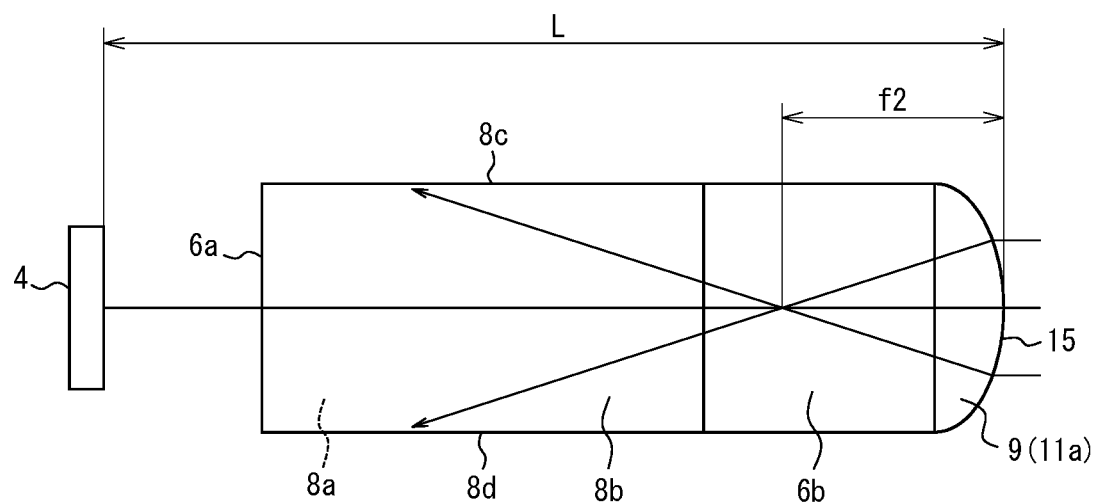
FIG. 4B is a front view illustrating how external light travels in the light guide prism of Embodiment 1.

FIG. 4A is a plan view illustrating an example of the optical path of external light in the light guide prism 5 of Embodiment 1, and FIG. 4B is a front view illustrating an example of the optical path of external light in the light guide prism 5 of Embodiment 1. As illustrated in FIGS. 4A, 4B, the light guide prism 5 of Embodiment 1 has the tip face 15a which is in a shape convexly curved forward to have a curvature. Thus, external light 16 incident from the prism tip face 15a is once condensed and then diffused to be irradiated onto the display device 4. The light guide prism 5 of Embodiment 1 is capable of reducing illuminance of the external light 16 to be irradiated onto the display device 4, as compared with the case where the light guide prism has a flat tip face as in FIGS. 3A, 3B.

Embodiment 2

Figure 5:
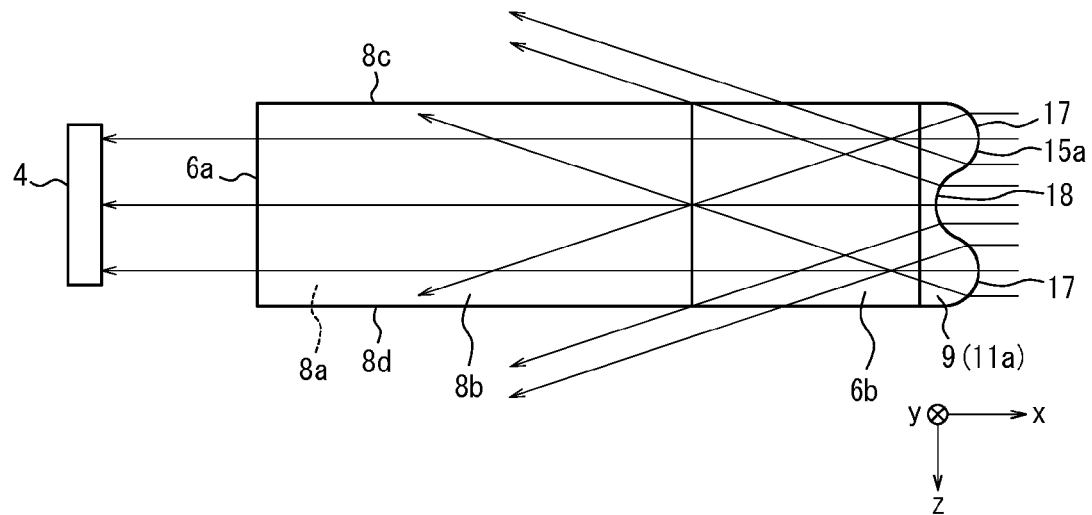
FIG. 5 is a front view illustrating how external light travels in a light guide prism of Embodiment 2.

FIG. 5 is a front view illustrating how external light travels in a light guide prism according to Embodiment 2 disclosed herein. As illustrated in FIG. 5, the light guide prism 5 of Embodiment 2 is different from the light guide prism 5 of FIGS. 3A, 3B in that the tip face 15a has a plurality of concave and convex portions 17, 18. Specifically, the tip face 15a has, on the forward side, two convex portions 17 each having a center of curvature within the light guide prism 5, and a concave portion 18 disposed between the two portions 17 while having a center of curvature outside the light guide prism 5.

Although not shown, the concave and convex portions 17, 18 are curved with a curvature in the x-z plane without having a curvature on a plane parallel with the y-axis, as in Embodiment 1 of FIGS. 2A, 2B.

According to the light guide prism 5 of Embodiment 2, the tip face 15a has a curvature, and thus, as in the aforementioned Embodiment 1, the external light 16 incident from the prism tip face 15a is once condensed and then diffused to be irradiated onto the display device 4, which can reduce the illuminance of the external light 16 to be irradiated onto the display device 4.

In the disclosed light guide prism 5, the tip face 15a may preferably have a plurality of convex portions 17, as in the light guide prism 5 of FIG. 5. The reason is that the plurality of convex portions can each be reduced in protrusion amount but still provide the same curvature radius as compared with the case of providing only one convex portion, and thus the same effect can be obtained.

In particular, as in the light guide prism 5 of FIG. 5, the tip face 15*a* may preferably have a portion 17 having a center of curvature within the light guide prism 5 and a portion 18 having a center of curvature outside the light guide prism 5 for the following reason. That is, as compared with the case of having only one convex portion, each of the convex and concave portions can have a smaller amount of protrusion and recess but still provide the same curvature radius as a whole, and thus the same effect can be obtained.

Here, the disclosed image display apparatus 1 may preferably satisfy the following relation:

$$f2<L/2,$$

where f2 represents the focal length of the tip face 15*a* on a section having the maximum curvature radius of the tip face 15*a*, and L represents the optical length from the tip face 15*a* to the display device 4.

When the above relation is satisfied, external light that has passed through the tip face 15*a* is further diverged on the display device surface, which can reduce the illuminance of incident external light.

Further, the disclosed light guide prism 5 may preferably satisfy the following relation:

$$f2<f1/2,$$

where f1 represents the focal length of the emission surface 7, and f2 represents the focal length of the tip face 15*a* on a cross section having the maximum curvature radius of the tip face 15*a*.

When the display position of a virtual image is set in a distance, the value of f1 is defined to be substantially equal to a length L from the display device 4 to the prism tip 9.

Accordingly, when the above relation is satisfied, external light that has passed through the tip face 15*a* is further diverged on the display device surface, which can reduce the illuminance of incident external light.

Embodiment 3

Figure 6:
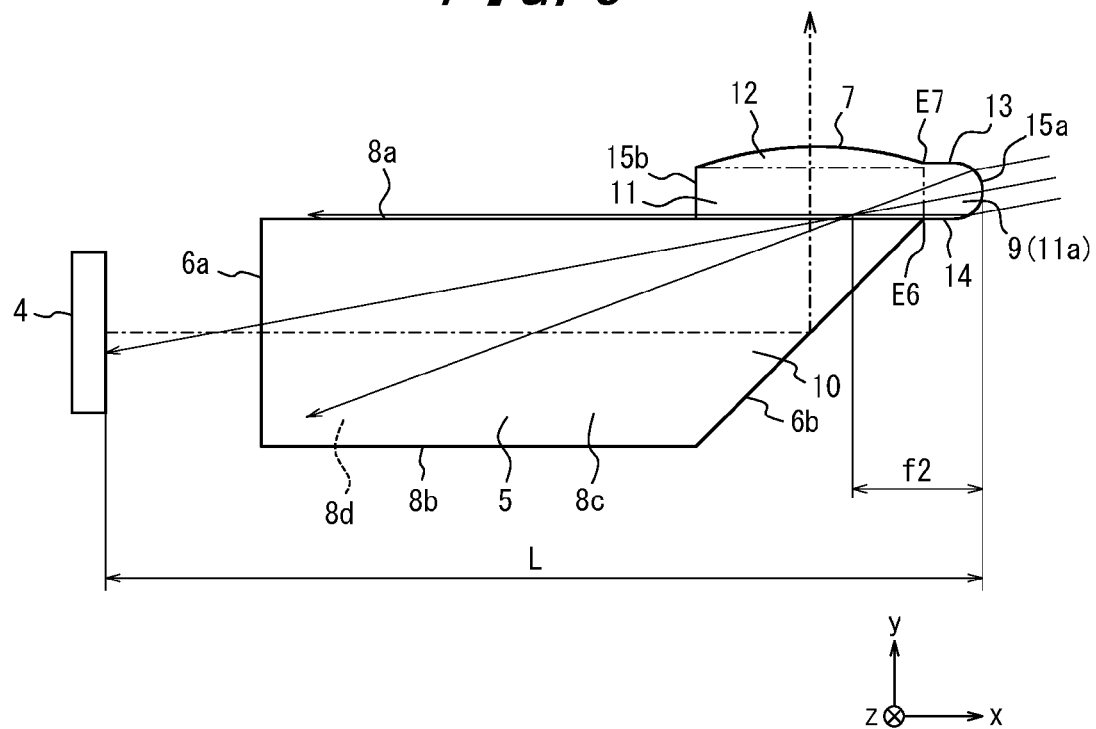
FIG. 6 is a plan view illustrating how external light travels in the light guide prism of Embodiment 3.

FIG. 6 is a plan view illustrating how external light travels in a light guide prism of Embodiment 3 disclosed herein. In the light guide prism 5 of Embodiment 3 of FIG. 6 is different from the light guide prisms of Embodiments of FIGS. 2A, 2B, and 5, in that the tip face 15*a* is curved with a curvature in the x-y plane, without having a curvature in a plane that is parallel with the z-axis.

In the light guide prism 5 of Embodiment 3, the tip face 15*a* also has a curvature, and thus, as in the case of the light guide prisms 5 of Embodiments above, the external light 16 incident from the prism tip face 15*a* is once condensed and then diffused to be irradiated onto the display device 4, which can reduce the illuminance of the external light 16 to be irradiated onto the display device 4.

In Embodiment 3 of FIG. 5, the following relation may preferably be satisfied for the same reasons as in Embodiment 2:

$$f2<L/2,$$

where f2 represents the focal length based on the curvature of the tip face 15*a*, and L represents a length from the tip end 15*a* to the display device 4.

The aforementioned Embodiments shall in no way limit the present disclosure, and may be subjected to various modifications and alternations. For example, in the aforementioned Embodiments, the prism tip 9 has been illustrated to have the flat faces 13, 14 which abut the tip face 15*a*. However, the flat faces 13, 14 may be omitted, and the tip face 15*a* may be configured to abut the emitting face 7 and the side face 8. Further, when, for example, the light guide prism 5 is in a shape having the display device 4 originally disposed in a position capable of avoiding direct irradiation of external light incident from the tip face 15*a*, the present disclosure is still applicable in order to further prevent the adverse effect of the external light. Further, for design reasons, the disclosed light guide prism may be applied with coatings.

In this case as well, there will be produced an effect that the display image will not be degraded even when the coatings are partially peeled off.

REFERENCE SIGNS LIST

1 image display apparatus
2 support
3 main body
4 display device
5 light guide prism
6*a* incident surface
6*b* reflection surface (emission side reflection surface)
7 emission surface
8*a* first side face
8*b* second side face
8*c* third side face
8*d* fourth side face
9 prism tip
10 light guide part
11 plate part
11*a* protruding part
12 convex lens part
13, 14 flat face
15*a*, 15*b* tip face
16 external light
17 convex portion
18 concave portion
E6, E7 end

The invention claimed is:

1. A light guide prism, comprising:
    an incident surface through which image light from a display device is incident;
    one or more reflection surfaces which reflect the image light incident thereon, the reflection surfaces including at least an emission side reflection surface; and
    an emission surface which forms an acute angle with the emission side reflection surface and emits the image light reflected by the emission side reflection surface, toward an eyeball of an observer,
    wherein the light guide prism has a tip face positioned between the emission side reflection surface and the emission surface, the tip face most protruding from an end of the emission side reflection surface and an end of the emission surface in a direction in which a width between the emission side reflection surface and the emission surface narrows, the tip face being, at least in part thereof, a curved face.

2. The light guide prism according to claim 1, wherein the tip face has a plurality of convex portions.

3. The light guide prism according to claim 1, wherein the tip face has a curved portion having a center of curvature within the light guide prism and a curved portion having a center of curvature outside the light guide prism.

4. The light guide prism according to claim 1,
wherein the emission surface is formed as a lens surface, and
wherein the light guide prism satisfies the following relation:

$f2 < f1/2$, where f1 represents the focal length of the emission surface and f2 represents the focal length of the tip face on a cross section having the maximum curvature radius of the tip face.

5. An image display apparatus, comprising:
a display device which emits image light;
the light guide prism according to claim 1; and
a support which fixedly supports the display device and the light guide prism onto a head of an observer.

6. The image display apparatus according to claim 5, which satisfies the following relation:

$f2 < L/2$, where f2 represents the focal length of the tip face on a cross section having the maximum curvature radius of the tip face; and L represents a length from the tip face to the display device.

\* \* \* \* \*